United States Patent
Bell et al.

(10) Patent No.: US 6,693,265 B1
(45) Date of Patent: Feb. 17, 2004

(54) APPARATUS AND PROCESSES SUITABLE FOR TIRE DEGRADATION

(75) Inventors: James Richard Bell, Cumbria (GB); Peter Ryan Skeels, Cheshire (GB)

(73) Assignee: Amat Limited, Crewe (GB)

(*) Notice: Subject to any disclaimer, the term of this patent is extended or adjusted under 35 U.S.C. 154(b) by 6 days.

(21) Appl. No.: 10/019,701

(22) PCT Filed: Jun. 3, 2000

(86) PCT No.: PCT/GB00/02356
§ 371 (c)(1),
(2), (4) Date: May 24, 2002

(87) PCT Pub. No.: WO01/03473
PCT Pub. Date: Jan. 11, 2001

(30) Foreign Application Priority Data

Jul. 1, 1999 (GB) .............................................. 9915247

(51) Int. Cl.[7] .................................................. H05B 6/80
(52) U.S. Cl. ........................................ 219/686; 219/680
(58) Field of Search ................................ 219/686, 680, 219/690–697, 746, 750; 156/345.41, 275.5, 345.42

(56) References Cited

U.S. PATENT DOCUMENTS

| | | | |
|---|---|---|---|
| 3,566,066 A | * 2/1971 | Borthwick et al. | ......... 219/750 |
| 5,330,623 A | 7/1994 | Holland | |
| 5,632,921 A | * 5/1997 | Risman et al. | ............... 219/750 |
| 5,639,414 A | * 6/1997 | Unseld | ........................ 264/402 |
| 5,855,728 A | * 1/1999 | Saitoh et al. | .......... 156/345.41 |
| 5,877,395 A | 3/1999 | Emery | |

* cited by examiner

Primary Examiner—Quang T. Van
(74) Attorney, Agent, or Firm—Young & Thompson (57) ABSTRACT

A degradation device for degrading tires includes an enclosed chamber (3) providing an annular housing space for a tire (1) to be treated. A microwave generator is connected to a wave guide (18) for splitting the generated microwave energy into arms (20 and 19) which are provided with outlets which will direct the energy both externally and internally of the annulus of the housing space. The microwave energy will cause the tire to break down into constituent parts. The chamber (3) is reciprocated and rotated with respect to the tire so that the microwaves will be projected relatively evenly through the tire. An inert gas is introduced into the chamber at (29), to limit the possibility of combustion or oxidation of degradation products created by the process. Volatile gaseous products of the process are drawn off through the exhaust pipe (26). Solid degradation products are created and are removed at the end of the process.

29 Claims, 6 Drawing Sheets

APPARATUS AND PROCESSES SUITABLE FOR TIRE DEGRADATION

Currently the disposal of worn tyres from vehicles represents a considerable problem. These tyres are not readily disposable and, in their normal state, occupy a substantial space. If they are placed on or in land-fill sites this either creates an unsightly mound or occupies substantial underground land-fill capacity. There is also the risk of a fire hazard which can be difficult to control and usually results in the emission of toxic fumes. The destruction of tyres by burning is not environmentally acceptable on open sites due to the emission of toxic fumes. Burning of tyres in an incinerator consumes substantial energy and creates large quantities of unusable waste products, and requires sophisticated emission scrubbing device to remove toxins.

It is an object of this invention to provide a means of degrading tyres in a manner which is environmentally acceptable and which ideally will result in usable degradation products According to the invention there is provided a degradation device suitable for degrading tyres and comprising an enclosed chamber providing an annular housing space for a tyre to be treated, a microwave generator connected to a wave guide for splitting the generated microwave energy into arms which are provided with outlets which will direct the energy both externally and internally of the annulus of the housing space, means for supplying an inert gas into the chamber, means for drawing off volatile gaseous products of the process, and collection means within the chamber for the solid degradation products created by operation of the device.

The arms could be constructed in accordance with electronically calculated design parameters to ensure suitable transmission of the microwaves so as to control "E" and "H" plane microwave energy. Apparatus for controlling reflected energy in either plane could also be incorporated. There could additionally be apparatus, such as a magnetic induction system attached to the device to optimise the induction of microwave energy to the tyres by focusing the microwaves in juxtaposition to any metallic bracing contained in the tyre.

A device of this nature is particularly suited to degrading tyres by providing that both the external and internal surfaces of the tyre are bombarded with microwaves by the wave guide and ensuring that the device is able to operate, by introduction of an inert gas, in such a way that oxidation and oxidative combustion during the whole process are minimised or excluded. Suitable control systems for the microwaves, for the inert gas and for the chamber temperatures can be operated to adjust processing to exclude the formation of pyrolytic graphite specifically, and other unwanted degradation products, and also to improve production of desirable products and to adjust processing times.

Operation of a degradation process on a tyre within a device of this nature can produce usable by-products in the form of carbon, steel and various oils which can be separated out from a condensate of the exhausted gases. The mixture of non-condensable gases may have a usable potential calorific value dependent on the process control parameters.

Ideally the device will include a drive motor and support assembly enabling rotation of the enclosed chamber and/or the tyres independently of the chamber, with respect to the microwave standing wave pattern generated in the process chamber by the microwave generator. Additionally, and desirably the device will include a drive member and support assembly enabling reciprocation of the enclosed chamber and/or the tyres independently of the chamber, with respect to the microwave standing wave pattern generated in the process chamber by the microwave generator. Rotation and reciprocation of a tyre within the device, during degradation processing of the tyre, improves the efficiency of the system by minimising "E" and "H" plane energy transfer inconsistencies and a fairly consistent degradation of the tyre can then be achieved It is much preferred that a convective kinetic energy transfer (heating) mechanism should be provided in the walls of the primary processing chamber to minimise premature condensation of process-released gaseous products. A thermal insulation jacket can be added to minimise convective energy losses.

The wave guide can be designed such that one set of arms directs microwaves directly into the inner region of the annulus of the housing space and another set of arms directs microwaves generally around the outer region of the annulus of the housing space. Each set could comprise a single arm.

The device can be arranged to stand such that the chamber and the annular housing space are set horizontally, with the wave guide being directed generally vertically into the chamber. Alternatively the device can be arranged to stand with the chamber and the annular housing space set in any generally vertical plane, with the waveguides also set in any plane relative to the device, but ideally in a plane lying normal to the plane of the chamber.

An outer condensing sleeve can be provided around the chamber to facilitate primary condensation of volatile gases leaving the process chamber. A removal mechanism comprising sealable hopper doors opening to a screwfeed, moving belt or table assembly can be provided at the base of the process chamber for removing particulate degradation products. A magnetic device can be attached to the process chamber or to a removal mechanism to extract any ferrous metallic degradation products.

Ideally there will be a pump or other recycling device to draw gases from the chamber. A passageway leading to the recycling device will preferably then include a condenser for condensing volatile products out of the outlet gases from the chamber. A separator can then be provided for separating out condensed volatile products This device will ideally include a mechanism for containing, recycling and/or destroying gases from the non-condensible fraction, including a means whereby suitable component gases may be used in the inert gas system of the device.

A support is ideally provided for holding a tyre to be treated above electronically inactive parts of the process chamber. This support member can be cage-like and/or can incorporate a support web on which a tyre can be supported in the process. This support cage or web can be constructed in resonant length sections to optimise energy transfer or inductance of microwaves.

The invention further extends to a process of degrading a tyre utilising a degradation device of this invention as hereinbefore defined, wherein a tyre is located in the annular housing space within the chamber and is subjected to microwave radiation directed at the outer and inner surfaces of the tyre by the wave guide, whilst maintaining atmospheric conditions within the chamber, by utilization of inert gases, to limit the possibility of combustion or oxidation of degradation products created by the process, and by drawing off volatile products from the chamber as they are created, and collecting solid degradation products for recycling.

Preferably the atmosphere within the process chamber will be maintained at a level such that the oxygen level is kept below 10 to 12%, preferably at about 5 to 8%. Carbon monoxide, nitrogen or other essentially non-ionic gases may be used to suppress or maintain the oxygen content at the desired level. Advantageously carbon monoxide formed as a by-product of the process can be recycled into the chamber as an oxygen suppressant.

The operating temperature within the process chamber should be maintained at such a level as to prevent micro-environment overheating in the process; preferably the maximum operating temperature in the chamber should not exceed 350° C.

It is preferred that volatile gases withdrawn from the chamber are passed through a condenser, where they can be separated into their constituent fractions; the hot uncondensed gases can be taken directly from the chamber to a conventional kinetic energy device (internal combustion or gas burner type) for energy extraction and/or conversion. It is preferable that such a device has a containment or recycling or cleaning device attached to the final emission route in order to exclude the possibility of unwanted emissions to atmosphere.

Tyres may be processed singly or in multiples, in whole or shredded form, within the chamber. The tyre, or collection of tyres, could be compressed axially and held in the compressed state within the chamber prior to starting up of the process.

A dielectric accelerator, such as a carbon particle by-product of a previous operation of the process, may, with advantage, be placed within the tyre to enhance the operation time and/or initiation of the process.

The invention may be performed in various ways and preferred embodiments thereof will now be described, by way of example, with reference to the accompanying drawings, in which.

Figures 1A, 1B:
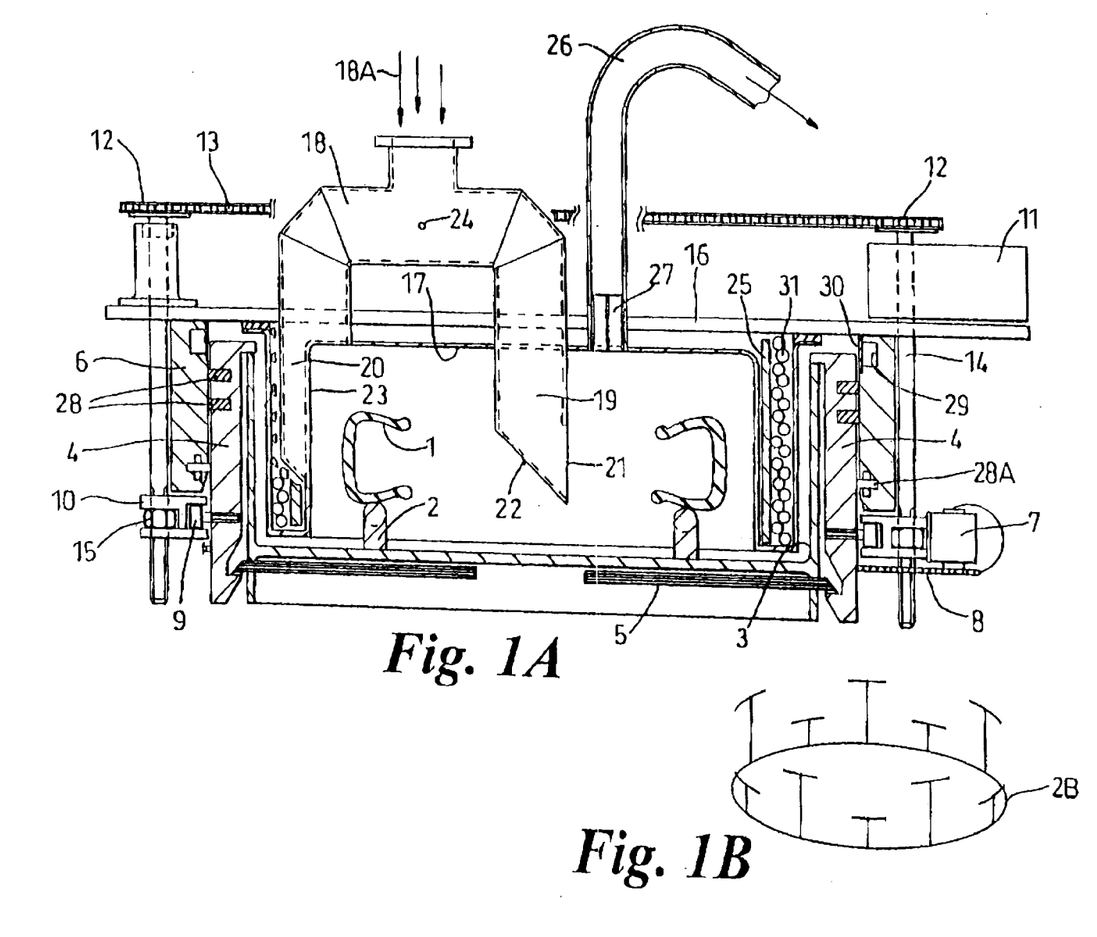
FIG. 1A is a vertical section through one form of tyre recycling device of this invention.
FIG. 1B shows a detail of a modification of the device of FIG. 1A.

The unit shown in FIG. 1 is used to break down a tyre 1 into constituent parts for recycling purposes. A tyre which is to be degraded is mounted upon a support 2 within a container 3 (or the modified cage like support 2B of FIG. 1B). This container is then offered up into and locked in place within an enclosure 4 by means of locking bars 5. The enclosure 4 is in turn located within an outer cylindrical body 6. A drive motor 7 is able to rotate the enclosure 4 and the associated container 3 by means of gears 8. Roller bearing devices 9 support the enclosure 4 and allow the enclosure to rotate with respect to a carrying ring 10. There is also a reciprocation drive member 11 which, by means of sprockets 12 and a chain 13, is able to rotate four jacking screws 14 distributed around the body 6. As the jacking screws 14 rotate, nuts 15 rise up or down the threaded ends of the jacking screws 14 to cause the carrying ring 10, and the associated enclosure 4, to reciprocate with respect to the outer body 6. Limit stops (not shown) act to cause the drive member 11 to reverse the direction of rotation when the nuts 15 approach their upper or lower limits of travel. By this means the tyre 1 is caused to reciprocate with respect to the fixed parts of the assembly.

The outer body 6 depends from a base plate 16. Also attached to the base plate 16 is a process chamber 17, within which the tyre 1 is reciprocated and rotated. Entering into the process chamber 17 is a microwave guide 18. This guides microwave radiation 18A down to arms 19 and 20 of the guide 18 which thus create a wave splitter. The microwaves leaving the arm 19, through the opening 21, are directed by the angled plate 22, into the interior of the tyre 1. The microwaves leaving the arm 20, through the L shaped outlet 23, are directed variously to exterior surfaces of the tyre 1. The optimum shapes of the plate 22 and outlet 23 could be electronically calculated. Variable screws 24 in the microwave flow path can be altered to modify the microwave flow characteristics. Specially modified power detectors and wave plane tuning devices may also be employed.

A heater jacket 25 is provided to maintain a constant operating temperature within the process chamber 17. This is to ensure that gases created by the degradation process do not condense within the process chamber. Instead they are drawn out through an exhaust pipe 26, which is provided with a microwave choke 27. Graphite piston rings 28 act as a gas barrier and, together with roller bearings 28A allow for the enclosure 4 to rotate with the respect to the outer body 6. An annular chamber 29 in the outer body 6 allows inert gas to be drawn into the process chamber, through a perforated screen 30, to replace the gases drawn off through the exhaust pipe 26. The process chamber wall also incorporates a thermal insulator 31 to limit the extent to which heat is transferred outwardly, particularly to the outer body 6.

Figure 2:
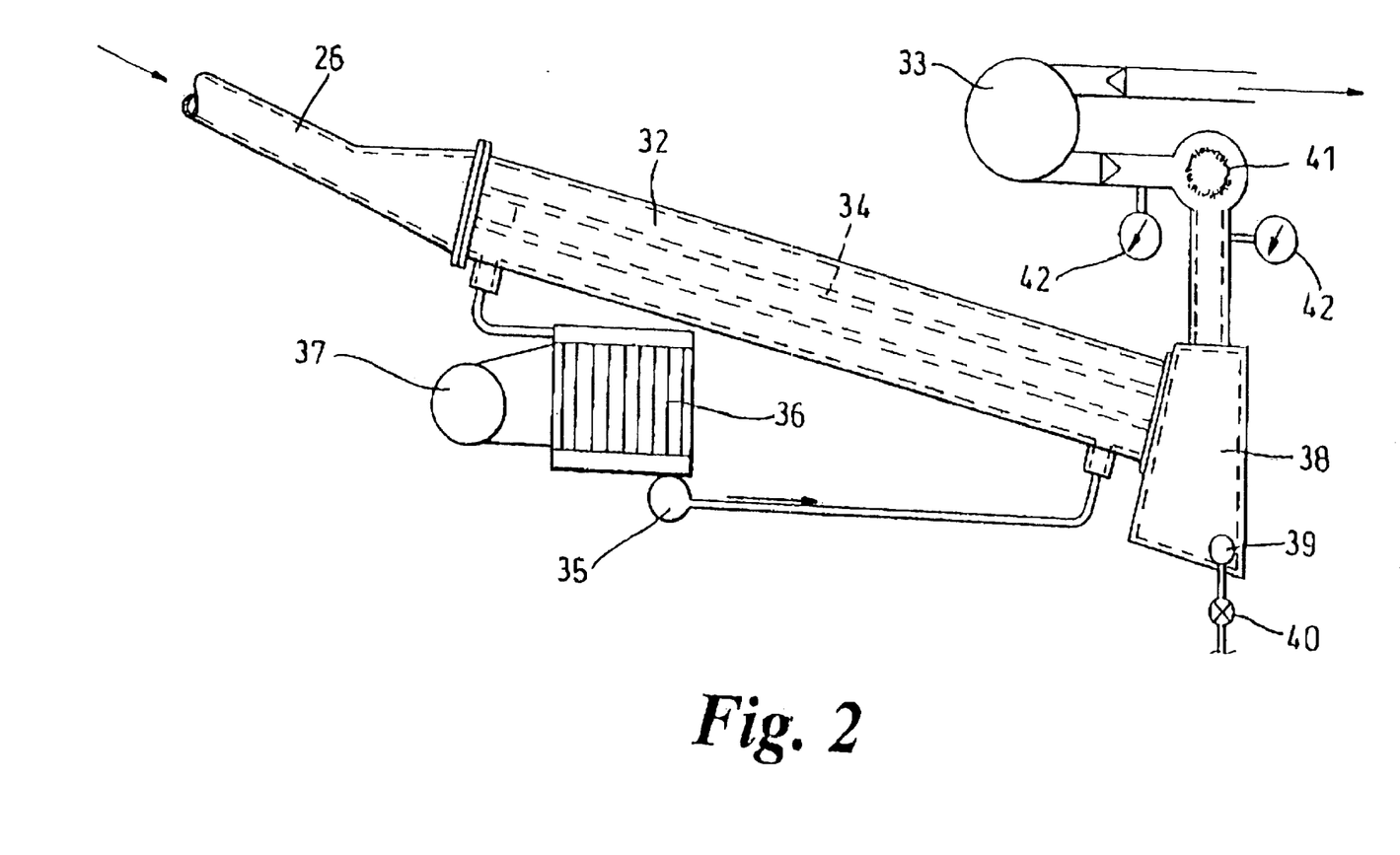
FIG. 2 is a side view of a gas condenser for use with the units shown in FIG. 1.

As shown in FIG. 2 the exhaust pipe 26 leads to a condenser 32 through which the gases from the process chamber 17 are drawn by a vacuum pump 33. The condenser incorporates an array of tubes 34 through which cooled water is passed by a pump 35. The returned heated water passes through a radiator 36 where it is cooled by a fan 37. Any condensate then runs off into a collecting chamber 38 which includes an oil separator 39 enabling oil to be drawn off by operating a ball valve 40. Uncondensed gases can go to atmosphere or be recycled back to the process after passing through a gas filter 41. Pressure gauges 42 enable the differential pressure across the filter 43 to be measured as part of an overall control system. With suitable control the system can be operated in such a way that toxic gases are not discharged to atmosphere.

The apparatus is used in the following way. Firstly a tyre is mounted within the container 3. It is possible to compress the tyre so that it occupies less vertical space. The tyre would be held in the compressed state by metal bracing straps. On a large scale apparatus it is envisaged that up to say 25 tyres could be housed in a compressed condition. The container is then offered up into the enclosure 4 and locked in place by the locking bars 5. The process chamber is brought up to the required minimum operating temperature (approx 300° C., the temperature at which premature condensation is minimised) and the internal atmosphere is purged to some extent by introducing an inert gas so as to reduce the level of oxygen within the process chamber, preferably to a level of about 5 to 8%, but ideally no greater than 12%. This gas is introduced through or beside the waveguides 19, 20. The inert gas could be nitrogen and/or carbon monoxide. In fact carbon monoxide will be a by-product of the process and this can be recycled back through or beside the waveguides 19, 20, (or through the chamber 29) during processing, thus reducing the need to provide an external supply source of a suitable inert gas. Carbon monoxide is relatively inert and acts as a suppressant gas within the chamber. It is necessary to keep the oxygen level low so as to avoid combustion of the volatile gases and burning of the carbon created during the process. Because of the operating conditions experienced, extreme care is taken to avoid certain gases which might create plasma conditions. At start up (and indeed during operation of the process) the operating conditions will be monitored to ensure that the desired temperature add gas pressure conditions throughout the system are within predetermined limits and that the composition of the gas within the process chamber is as desired.

Once the start up conditions have been reached a microwave generator (not shown) will be actuated and the microwave radiation will be passed through the microwave guide so as to be directed against the internal and external surfaces of the tyre 1. Additionally the enclosure 4 and the associated container 3 will be rotated by the drive motor 7. At the same time the enclosure 4 and the container 3 are reciprocated in the vertical direction by actuating the drive member 11. Rotation of the tyre through the microwave outlet region minimises x-axis hot spots. Reciprocation of the type 1 minimises y-axis hot spots. By this means even distribution of microwave energy over time throughout the tyre can be achieved. This results in a fairly consistent degradation of the tyre, At the temperature and other operating conditions experienced, the tyre is caused to degrade into various constituent parts, thus producing a number of reusable by-products The rubber body itself degrades into carbon particles, resulting in about 85% "pure" carbon. This can be reused in the manufacture of new tyres The carbon produced is essentially non-graphitic, so long as crystallisation temperatures are not reached (in other words the microenvironment temperature should not exceed 800° C., but ideally the maximum operating temperature will be kept below 350° C.). It will be appreciated that the microwaving process itself creates localised microenvironments of very high temperatures and pressures. During the process some plasticised carbon lumps may be created and these can afterwards be passed through rollers to break up the particles. If desired the small amount of carbon which is not in powder form cam be recycled within the process, as will be explained later. The steel reinforcement is exposed and separated by the process and can readily be recycled in a steel reprocessing plant. The volatiles which are condensed within the condenser 32 can be separated into usable components. Thus there will be a significant quantity of a reasonably usable light fraction hydrocarbon oil (which can be refined as necessary). Also it has been found that the process creates significant amounts of terpenes which are valuable cleaning and perfuming chemicals, particularly for printed circuit board cleaning or for incorporation into detergents and perfumes. As mentioned previously the exhaust gases include a proportion of carbon monoxide which can be used as a relatively inert gas within the system by passing the exhaust gases (or a proportion thereof) back into the process chamber through or beside the waveguides 19, 20.

Operation of the process reduces a bulky tyre, which has otherwise proved difficult to destroy, into relatively compact quantities of carbon powder, steel wire and reusable oils. The by-products are valuable in their own right and can, at the very least, defray the cost of operating the process. Furthermore there is no significant pollution created (such as is achieved by burning tyres), nor are land-fill sites required into which untreated tyres are conventionally placed.

Microwave heating of materials can be enhanced by the incorporation of aerialisation metal bodies. Each tyre does of course incorporate metal bracing wire, usually in a spiral array, thus creating an internal metal mesh embedded in the tyre rubber. Whilst this would normally act as a microwave choke the bracing wires also act as quite an effective aerial, particularly since the microwaves are directed internally and externally of the tyre 1 and thus to either side of the bracing wire assembly. Furthermore the bracing effectively creates an extra resonant chamber for the microwave energy. The rotation and reciprocation of the tyre through the three dimensional standing-wave pattern of the microwave energy helps to resonate the "aerial" created by the bracing wires, thus resulting in a fairly even distribution of energy throughout the tyre. The cage-like support 2B of FIG. 1B also helps to provide a resonant aerial effect.

A further enhancement of the microwaving effect is achieved by the incorporation of dielectric accelerators. To an extent certain constituent parts of the assembled tyre act as accelerators. Carbon is a particular example. As mentioned previously carbon particles created by processing a previous tyre can be used in the processing of a subsequent tyre. These particles act as accelerators nd can be placed within the tyre cavity. The particles are well degraded and therefore attract microwaves so as, in particular, to accelerate the start of the new process. Furthermore these particles will themselves ultimately be degraded into the desired powder form. Operation of the process as illustrated in the machine of FIG. 1 has been found to result in 95% of degradation of a single car tyre in about 45 minutes. The degradation might increase to 97% in about 60 minutes. A trade-off can be achieved by operating for the shorter period of time and utilising the non degraded carbon particles in the subsequent process as accelerators.

Figure 3:
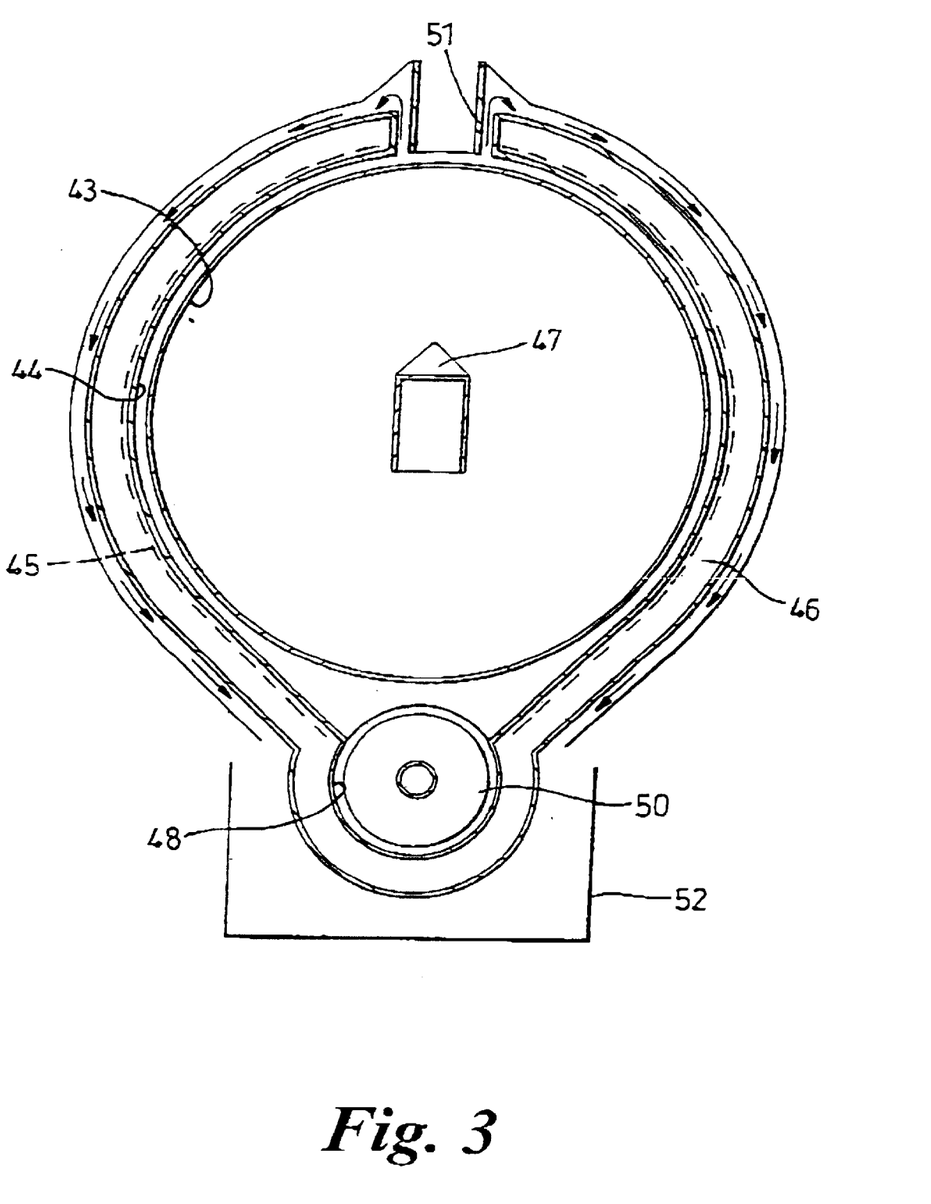
FIG. 3 is a partial cross-section of an alternative form of tyre recycling unit of the invention.
Figure 4:
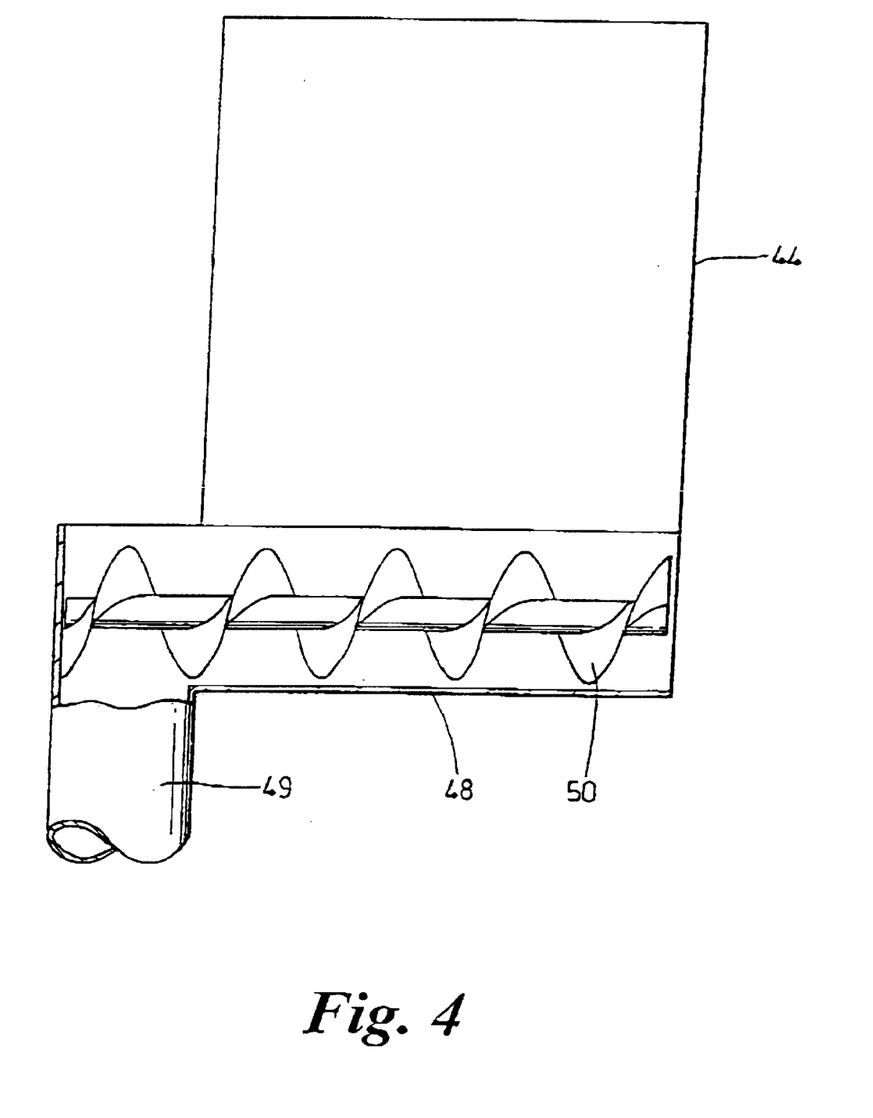
FIG. 4 is a partial vertical cross-section at right angles to that of FIG. 3.

An alternative form of processing apparatus for degrading tyres by microwave energy is illustrated in FIGS. 3 and 4. In this case the tyres are vertically (rather than horizontally) mounted within a container 43. Surrounding the container 43 is an enclosure 44 provided with an internal heating band 45 (with the outer region 46 incorporating a thermal insulator). The container 43 is rotated and reciprocated (horizontally) by suitable drive means with respect to a microwave guide (not shown) similar to that illustrated at 18 in FIG. 1, which directs microwave energy at the external and internal surfaces of the tyre. Inert gas supply is provided through a central entry passageway 47. Powdered carbon created as a result of the degradation process will fall into a chamber 48 where it can be removed to an outlet passage way 49 by means of an auger 50 (see FIG. 4) or through sealed hopper doors. The volatile gases will be drawn up through an upper outlet passageway 51 and down around the outside of the enclosure 44 where cooling and a degree of condensing can take place. Condensed oils will then fall out into a collecting chamber 52 and the remaining gases will be drawn out through a gas filter in much the same way as is illustrated in FIG. 2. This system reduces the possibility that the powdered carbon will be contaminated by the condensate. In this example the container 43 will be of a resonant aerial cage-like form which will hold the rotating tyre in the desired position relative to the microwave guide. The support 2 in the apparatus as shown in FIG. 1 could also be replaced by a resonant aerial cage-like holder which will support the tyre around its outer face, above the floor of the container 3 and set away from the sides and top of the container 3 such that the electronically inactive area (microwave reflection "cold-spot") does not inhibit tyre degradation.

Figure 5:
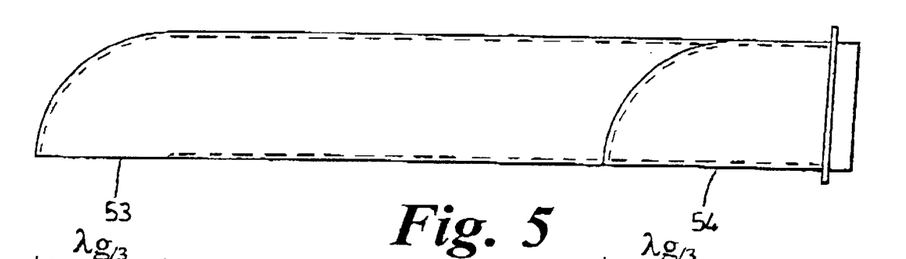
FIGS. 5 and 6 are side and underneath plan views respectively of an inner wave guide design for the recycling unit.
Figure 6:
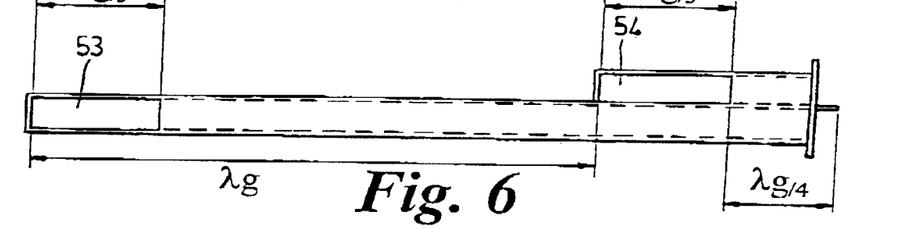

FIGS. 5 and 6 illustrate how the central arm of the wave guide can be provided with dual outlets 53 and 54. This overlapping outlet design helps to create a fairly even power output of microwaves to the interior of the tyre. The relative lengths of the various parts are indicated with respect to the wavelength of the microwave energy which is being radiated.

Figure 7:
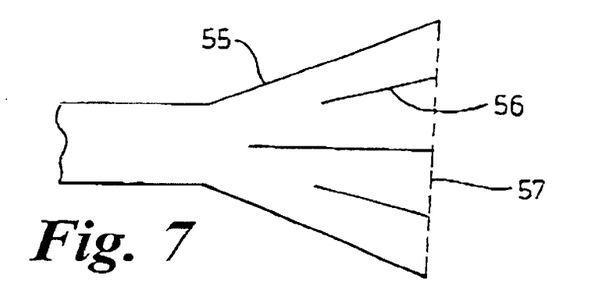
FIG. 7 is an illustration of a design for the outer wave guide of the recycling unit.

Ideally, the outer arm of the wave guide will be constructed in the form of a horn 55 (FIG. 7) with internal dividing plates 56 which split the microwaves precisely evenly over the four outlets 57 thus created.

Figure 8:
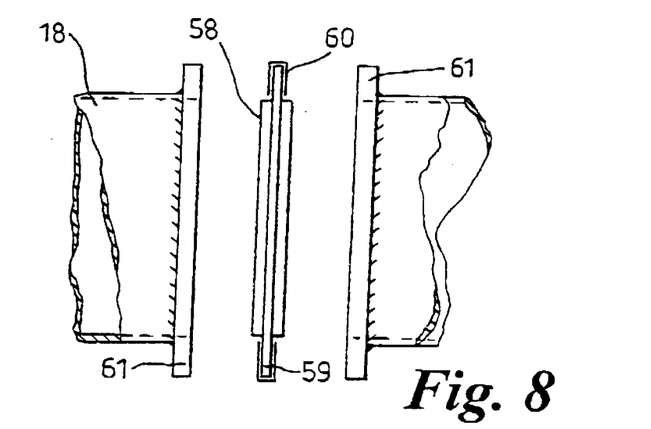
FIG. 8 illustrates features of the fitting of a microwave window in the wave guide.

The inlet 18 for the microwave guide will incorporate a microwave window 58 as shown in FIG. 8. This window is machined from PTFE sheet to suit the internal dimensions of the two parts of the wave guide which are being joined together. This permits accurate alignment and a good gas seal. A microwave "seal" is achieved by wrapping the flange area 59 with a self-adhesive aluminium tape or a pre-formed metal section 60 which locates between the two flanges 61 of the parts of the guide 18, which are to be bolted together.

Figure 9:
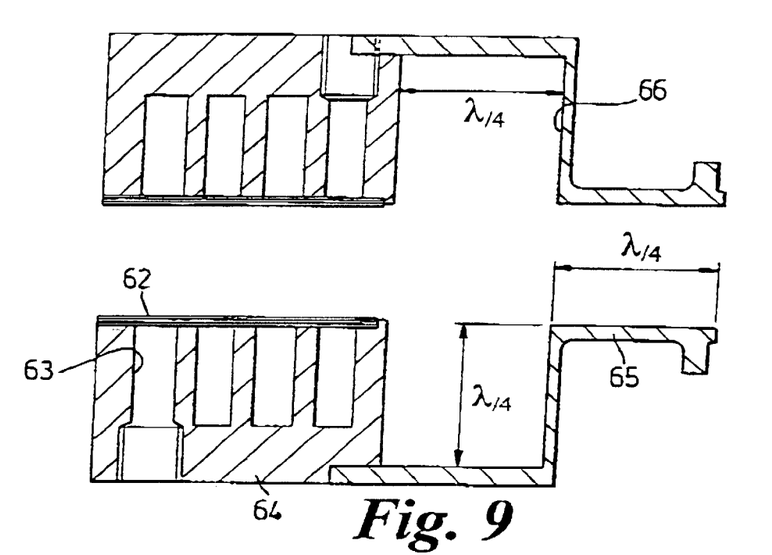
FIG. 9 is a section through a shaft bearing and microwave choke for the recycling device.

The drive shaft for rotating a container which will incorporate the tyres being treated needs to pass through the body of the apparatus to connect to an external drive member. A design for the bearing of the drive shaft is illustrated in FIG. 9. A lead/PTFE bush 62 is provided for the drive shaft and this is cooled by water passing through passageways 63 in an aluminium block 64. A sleeve 65, through which the shaft passes, and a chamber 66 between this sleeve 65 and block 64, are constructed to the dimensions indicated, relative to the frequency of the microwave energy used in the apparatus. These dimensions ensure that the microwave energy is constrained from escaping to the exterior.

Figures 10, 11, 12:
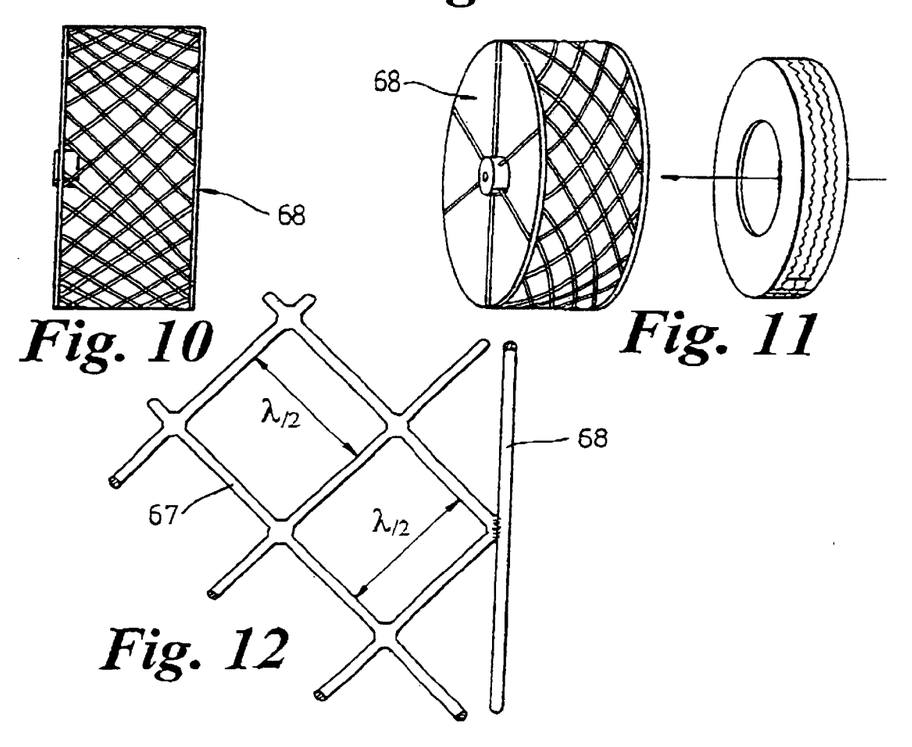
FIG. 10 is a side view of a preferred form of tyre location cage for the recycyling device.
FIG. 11 is a perspective view of the cage in FIG. 10.
FIG. 12 is an enlarged view of the cage in FIG. 10.

A particularly preferred form of cage for holding tyres to be treated is illustrated in FIGS. 10 to 12. The depth and radius of the cage will be determined from the size of the tyres to be treated and the number of tyres to be incorporated into the cage during any one treatment session. As can be seen from FIG. 12, the bars 67 of the cage 66 are constructed to have lengths equal to half the wavelength of the microwave energy which is to be used in the apparatus. This assists in inducing microwave energy into the tyre and the mesh-like construction also provides good inherent strength.

What is claimed is:

1. A degradation device suitable for degrading tires and comprising an enclosed chamber providing an annular housing space for a tire to be treated, a microwave generator connected to a wave guide for splitting the generated microwave energy into arms which are provided with outlets which will direct the energy both externally and internally of the annulus of the housing space, means for supplying an inert gas into the chamber, means for drawing off volatile gaseous products of the process, and collection means within the chamber for the solid degradation products created by operation of the device.

2. A device according to claim 1 including a drive motor and support assembly enabling rotation of the enclosed chamber and/or the tires independently of the chamber, with respect to the microwave standing wave pattern generated in the process chamber by the microwave generator.

3. A device according to claim 1 including a drive member and support assembly enabling reciprocation of the enclosed chamber and/or the tires independently of the chamber, with respect to the microwave standing wave pattern generated in the process chamber by the microwave generator.

4. A device according to claim 1 incorporating a convective kinetic energy transfer heating mechanism provided in the walls of the primary processing chamber.

5. A device according to claim 4, wherein a thermal insulation jacket is provided for the heat transfer mechanism.

6. A device according to claim 1, wherein one set of arms of the wave guide is designed to direct microwaves directly into the inner region of the annulus of the housing space and another set of arms of the wave guide is designed to direct microwaves generally around the outer region of the annulus of the housing space.

7. A device according to claim 1, wherein the device is arranged to stand such that the chamber and the annular housing space are set horizontally, with the wave guide being directed generally vertically into the chamber.

8. A device according to claim 1, arranged such that the chamber and the annular housing space are set in a generally vertical plane, with the waveguides being set in any plane relative to the device, but ideally in a plane lying normal to the plane of the chamber.

9. A device according to claim 8, wherein an outer condensing sleeve is provided around the chamber to facilitate primary condensation of volatile gases leaving the chamber.

10. A device according to claim 8, wherein a removal mechanism comprising sealable hopper doors opening to a screw feed, moving belt or table assembly is provided at the base of the chamber for removing particulate degradation products.

11. A device according to claim 1, wherein a magnetic device is attached to the process chamber or to a removal mechanism to extract any ferrous metallic degradation products.

12. A device according to claim 1, wherein a pump or other recycling device is provided to draw gases from the chamber.

13. A device according to claim 12 wherein a passageway leading to the recycling device includes a condenser for condensing volatile products out of the outlet gases from the chamber.

14. A device according to claim 13, wherein a separator is provided for separating out condensed volatile products.

15. A device according to claim 13, wherein the recycling device includes a mechanism for containing, recycling and/or destroying gases from the non-condensible fraction.

16. A device according to claim 1, wherein a support is provided for holding the tire to be treated above electronically inactive parts of the chamber.

17. A device according to claim 16, wherein the support member is cage-like and/or incorporates a support web on which the tire can rest.

18. A device according to claim 17, wherein the support cage or web is constructed in resonant length sections to optimize energy transfer or inductance of microwaves.

19. A device according to claim 1, including a magnetic induction system for optimizing the induction of microwave energy to the tires by focusing the microwaves in juxtaposition to any metallic bracing contained in the tire.

20. A process of degrading the tire utilizing a degradation device comprising an enclosed chamber providing an annular housing space for the tire to be treated, a microwave generator connected to a wave guide for splitting the generated microwave energy into arms which are provided with outlets which will direct the energy both externally and internally of the annulus of the housing space, means for supplying an inert gas into the chamber, means for drawing off volatile gaseous products of the process, and collection means within the chamber for the solid degradation products created by operation of the device, wherein the tire is located in the annular housing space within the chamber and is subjected to microwave radiation directed at the outer and inner surfaces of the tire by the wave guide, whilst maintaining atmospheric conditions within the chamber, by utilization of inert gases, to limit the possibility of combustion or oxidation of degradation products created by the process, and by drawing off volatile products from the chamber as they are created, and collecting solid degradation products for recycling.

21. A process according to claim 20, wherein the atmosphere within the process chamber is maintained at a level such that the oxygen level is kept below 10 to 12%, preferably at about 5 to 8%.

22. A process according to claim 21, wherein carbon monoxide, nitrogen or other essentially non-ionic gases are used to suppress or maintain the oxygen content at the desired level.

23. A process according to claim 22, wherein carbon monoxide formed as a by-product of the process is recycled into the chamber as an oxygen suppressant.

24. A process according to claim 20, wherein the operating temperature within the process chamber is maintained at below 350° C.

25. A process according to claim 20, wherein volatile gases withdrawn from the chamber are passed through a condenser.

26. A process according to claim 25, wherein condensed liquids are separated out into constituent fractions.

27. A process according to claim 20, wherein tires are processed singly or in multiples, in whole or shredded form, within the chamber.

28. A process according to claim 20, wherein the tire, or collection of tires, is compressed axially and held in the compressed state within the chamber prior to starting up of the process.

29. A process according to claim 20, wherein a dielectric accelerator, such as a carbon particle by-product of a previous operation of the process, is placed within the tire to enhance the operation time and/or initiation of the process.

* * * * *